(12) United States Patent
de Lima Zocca et al.

(10) Patent No.: US 11,067,157 B2
(45) Date of Patent: Jul. 20, 2021

(54) TORQUE CONVERTER CLUTCH SYSTEM

(71) Applicant: Schaeffler Technologies AG & Co. KG, Herzogenaurach (DE)

(72) Inventors: Felipe de Lima Zocca, Wooster, OH (US); Victor Norwich, Wooster, OH (US); Austin Hoff, New Franklin, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/923,392

(22) Filed: Jul. 8, 2020

(65) Prior Publication Data

US 2021/0010578 A1    Jan. 14, 2021

Related U.S. Application Data

(60) Provisional application No. 62/909,575, filed on Oct. 2, 2019, provisional application No. 62/873,091, filed on Jul. 11, 2019.

(51) Int. Cl.
| | |
|---|---|
| *F16H 45/02* | (2006.01) |
| *F16H 41/28* | (2006.01) |
| *F16H 41/24* | (2006.01) |

(52) U.S. Cl.
CPC ............. *F16H 45/02* (2013.01); *F16H 41/28* (2013.01); *F16H 2041/243* (2013.01); *F16H 2045/0205* (2013.01); *F16H 2045/0215* (2013.01); *F16H 2045/0221* (2013.01)

(58) Field of Classification Search
CPC .................................. F16H 40/02–2045/0294
See application file for complete search history.

(56) References Cited

U.S. PATENT DOCUMENTS

| | | | |
|---|---|---|---|
| 7,621,385 B2 | 11/2009 | Samie et al. | |
| 9,534,641 B2* | 1/2017 | Cerreta | F16D 25/12 |
| 2002/0027053 A1 | 3/2002 | Back et al. | |
| 2006/0124421 A1* | 6/2006 | Ackermann | F16H 45/02 |
| | | | 192/3.29 |

(Continued)

FOREIGN PATENT DOCUMENTS

WO    2007079713 A2    7/2007

OTHER PUBLICATIONS

U.S. Appl. No. 16/810,026, filed Mar. 5, 2020, inventor Hoff et al.

*Primary Examiner* — Charles A Fox
*Assistant Examiner* — Farhana Pervin
(74) *Attorney, Agent, or Firm* — LeKeisha M. Suggs

(57) ABSTRACT

A torque converter includes a front cover, an impeller having an outer shell non-rotatably connected to the front cover, and a turbine. A lock-up clutch is disposed axially between the front cover and the turbine. The lock-up clutch includes a piston axially displaceable and having a first opening extending from a first axial side facing the front cover to a second axial side facing the turbine. A seal ring is fixed to the front cover and sealed to the piston. A first fluid chamber is formed at least in part by the piston and the turbine, and a second fluid chamber is formed at least in part by the front cover, the seal ring, and the piston. A valve is connected to the piston and is configured to seal the first opening in response to a pressure difference in the first and second fluid chambers.

16 Claims, 2 Drawing Sheets

(56) References Cited

U.S. PATENT DOCUMENTS

| | | |
|---|---|---|
| 2011/0005880 A1 | 1/2011 | Carrier et al. |
| 2012/0006642 A1 | 1/2012 | Greathouse et al. |
| 2014/0345553 A1* | 11/2014 | Fambach .............. F16F 15/134 |
| | | 123/179.1 |
| 2017/0211673 A1 | 7/2017 | Norwich et al. |
| 2019/0293175 A1* | 9/2019 | Yasuda .................. F16H 61/12 |

* cited by examiner

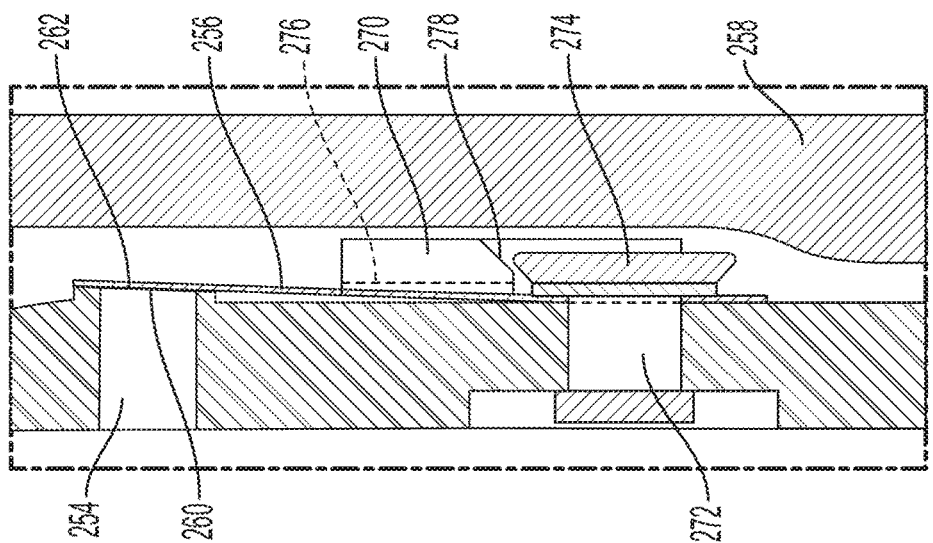
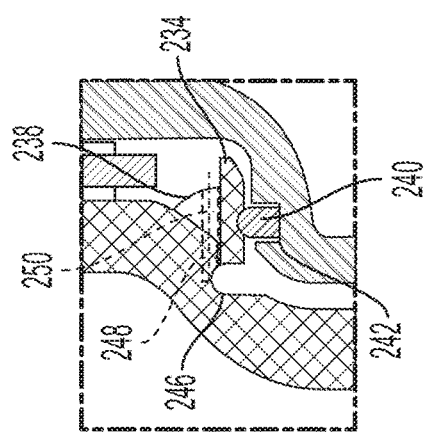
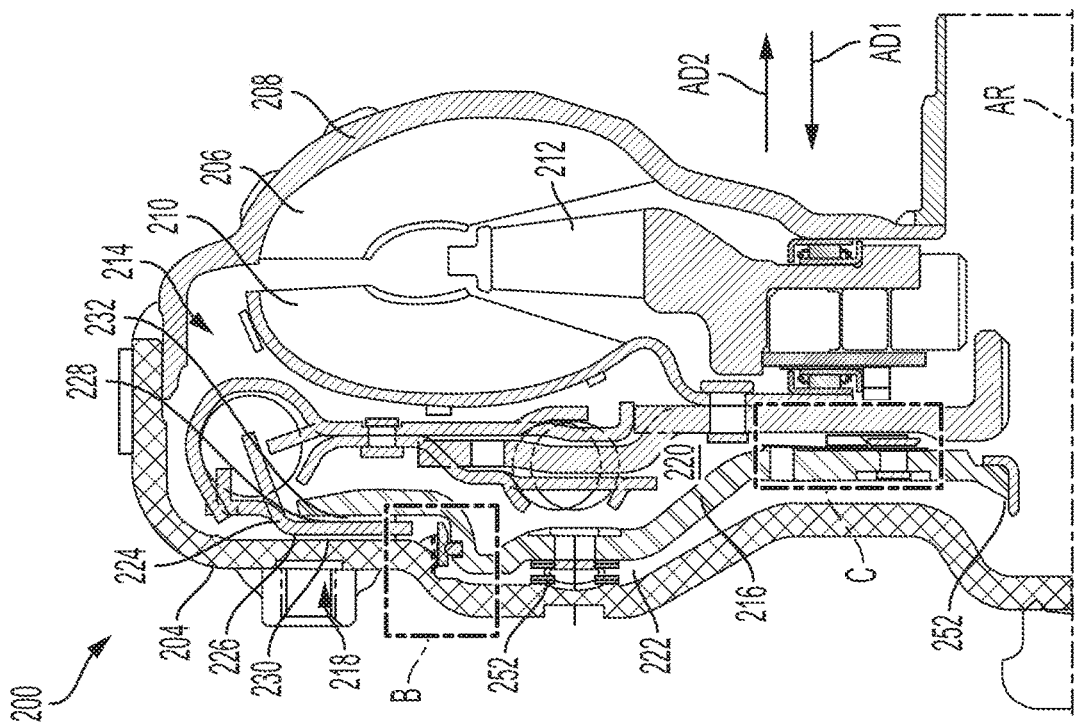

TORQUE CONVERTER CLUTCH SYSTEM

CROSS-REFERENCE TO RELATED APPLICATIONS

This application claims the benefit of U.S. Provisional Patent Application No. 62/873,091, filed Jul. 11, 2019 and U.S. Provisional Application No. 62/909,575 filed Oct. 2, 2019, the disclosures of which are incorporated in their entirety by reference herein.

TECHNICAL FIELD

The present disclosure relates to torque converters and, specifically, to clutch systems for a torque converter.

BACKGROUND

Automotive vehicles with automatic transmissions are known to be equipped with a torque converter. The torque converter is a fluid coupling that can transfer rotating power from an engine to an automatic transmission. Torque converters typically include a front cover fixed to an impeller, which rotate as a unit to transfer fluid through the torque converter.

To improve fuel economy, many torque converters include a bypass or lock-up clutch that mechanically couples the turbine shaft to a case of the torque converter to bypass the fluid coupling. Torque converters may have multiple flow passages for clutch apply and release. It is known to use cross-flow hubs for providing flow paths for clutch apply and release pressure chambers. However, these hubs may be expensive and add complexity to a torque converter design. Accordingly, it is desirable to provide alternative methods for providing fluid flow paths to pressurized chambers of a torque converter, while maintaining clutch controllability and reducing design complexity.

SUMMARY

In embodiments disclosed herein, a torque converter comprises a front cover configured to receive an input torque; an impeller having an outer shell non-rotatably connected to the front cover; and a turbine fluidly coupled with the impeller. A lock-up clutch may be disposed axially between the front cover and the turbine. The lock-up clutch may comprise a piston axially displaceable and including a first opening extending from a first axial side facing the front cover to a second axial side facing the turbine. A seal ring may be fixed to the front cover and sealed to the piston. A first fluid chamber may be formed at least in part by the piston and the turbine, and a second fluid chamber may be formed at least in part by the front cover, the seal ring, and the piston. A valve may be connected to the piston on the second axial side and configured to seal the first opening in response to a difference between a first pressure in the first fluid chamber and a second pressure in the second fluid chamber.

In embodiments, the valve may be configured to seal the first opening in the piston in response to the first pressure exceeding the second pressure such that fluid is prevented from passing through the first opening in the piston. The valve may be configured to open in response to the second pressure exceeding the first pressure such that fluid is routed from the second fluid chamber into the first fluid chamber via the first opening in the piston. In embodiments, the piston may be non-rotatably connected to the front cover on the first axial side via a connector; and the valve may be connected to the second axial side of the piston via the connector. The connector may be a rivet.

In embodiments, the front cover may include a second opening defined therein located radially outward of the seal ring and arranged such that forced cooling fluid flow passes through the lock-up clutch to the second fluid chamber via the second opening when the lock-up clutch is closed. The seal ring may include a third opening aligned with the second opening and arranged such that the forced cooling fluid flow passes through the lock-up clutch, the second opening, the third opening, and then into the second fluid chamber when the lock-up clutch is closed. In other embodiments, the seal ring may be fixed to the front cover by a weld; and the weld may include a third opening aligned with the second opening and arranged such that the forced cooling fluid flow may pass through the lock-up clutch, the third opening, the second opening, and then into the second fluid chamber. A thrust washer may be axially retained on the second axial side of the piston, wherein the valve may be disposed axially between the piston and the thrust washer. The thrust washer and the valve may be connected to the piston via a single connector. The thrust washer may also include at least one slot defined in a back surface thereof that faces the piston, wherein the at least one slot is arranged to provide clearance for axial movement of the valve when in an open position.

In embodiments disclosed herein, a torque converter comprises a lock-up clutch disposed axially between a front cover and a turbine. The lock-up clutch may comprise a piston sealed to the front cover and include a first opening. A first fluid chamber may be formed at least in part by the piston and the turbine; and a second fluid chamber may be formed at least in part by the front cover and the piston, wherein the first opening fluidly connects the first fluid chamber and the second fluid chamber. A valve may be connected to the piston and configured to seal the first opening in response to a first pressure in the first fluid chamber exceeding that of a second pressure in the second fluid chamber.

In embodiments, a seal ring may be disposed between the front cover and the piston, wherein the seal ring is fixed to the front cover and sealed to an outer diameter of the piston. In a first mode of operation: the lock-up clutch is in an open position; the second pressure in the second fluid chamber exceeds that of the first pressure in the first fluid chamber; and the valve is open such that fluid is routed from the second fluid chamber into the first fluid chamber through the first opening. In a second mode of operation: the lock-up clutch is in a closed position; the first pressure in the first fluid chamber exceeds the second pressure in the second fluid chamber; the valve is closed such that fluid is prevented from passing through the first opening; and forced cooling fluid flow passes through the lock-up clutch to the second fluid chamber via a second opening defined in the front cover. A vibration damper may further be provided having an output flange, and a thrust washer axially retained on the piston and arranged in a thrust path between the piston and the output flange.

BRIEF DESCRIPTION OF THE DRAWINGS

FIG. 3 shows a torque converter having a clutch system according to another embodiment of the present disclosure.

FIG. 4 is an enlarged view of area B of the torque converter of FIG. 3.

FIG. 5 is an enlarged view of area C of the torque converter of FIG. 3.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In general, having increased torque converter clutch controllability helps improve vehicle efficiency and NVH. However, it typically increases cost to have a more complex clutch system design, like a traditional three or four-pass torque converter design. It is an objective of the present disclosure to provide a clutch system having increased clutch controllability for a simpler and less expensive design, such as an improved clutch system for a two-pass torque converter design.

Figure 2:
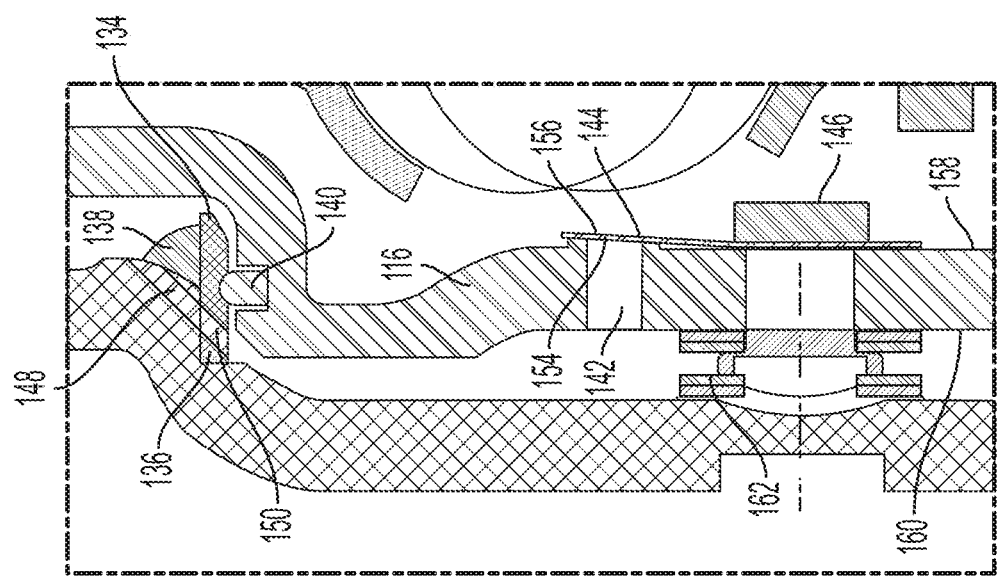
FIG. 2 is an enlarged view of area A of the torque converter of FIG. 1.
Figure 1:
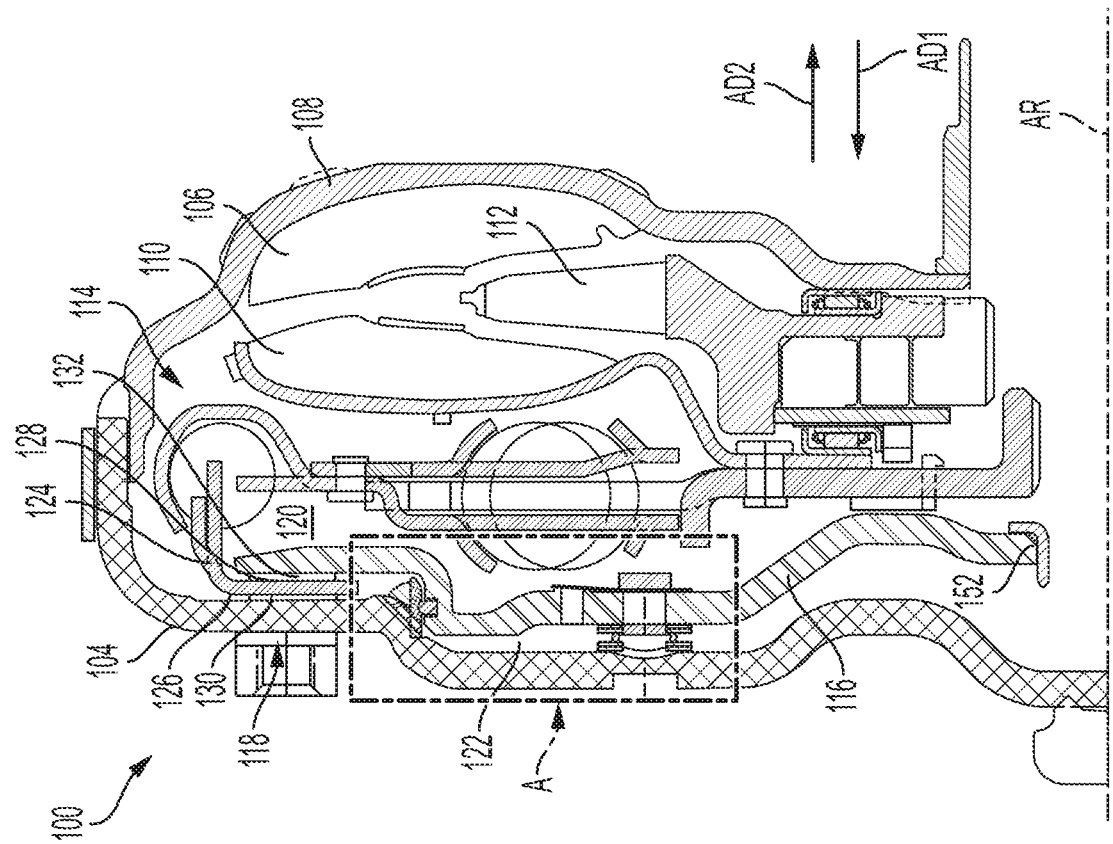
FIG. 1 shows a torque converter having a clutch system according to the present disclosure.

FIG. 1 shows torque converter 100 having a clutch system according to one embodiment of the present disclosure. FIG. 2 is an enlarged view of area A of torque converter 100 of FIG. 1. The following description is with reference to FIGS. 1-2. Torque converter 100 is rotatable about central axis AR. While only a portion above axis AR is shown in FIG. 1, it should be understood that the torque converter can appear substantially similar below the axis with many components extending about the axis. Words such as "axial," "radial," "circumferential," "outward," etc. as used herein are intended to be with respect to central axis AR.

Power from a vehicle engine (not shown) can be transmitted to a transmission via torque converter 100. The power may first be transmitted to front cover 104 of torque converter 100. Torque converter 100 includes pump or impeller 106 with outer shell or impeller shell 108 non-rotatably connected to front cover 104 such that impeller 106 rotates as front cover 104 rotates. Torque converter 100 also includes turbine 110, stator 112, and vibration damper 114 for hydraulically transferring torque through torque converter 100. These components are shown as examples of components of the torque converter, and in other embodiments could be replaced by any type or style of cover, impeller, turbine, stator, and/or vibration damper known in the art, and in some embodiments, some of these components may not even be included.

Torque converter 100 includes piston 116 that is configured to selectively engage and disengage clutch 118 in response to the pressurization of a medium (e.g., fluid such as oil) in various chambers of torque converter 100 (e.g., piston apply chamber 120 and fluid release chamber 122) on opposite axial sides of piston 116. For example, in one embodiment, an increase in fluid pressure within piston apply chamber 120 relative to release chamber 122 moves piston 116 in axial direction AD1 toward front cover 104, which increases a compressive force on clutch 118, causing clutch 118 to engage or close to transmit torque therebetween. Clutch 118 may include clutch plate 124 that also acts as an input to damper 114. Clutch plate 124 includes a first radial surface 126 configured to engage with front cover 104 and a second radial surface 128 configured to engage with a portion of piston 116 when clutch 118 is closed. Additionally, clutch facing 130 may be disposed between first radial surface 126 and front cover 104, and clutch facing 132 may be disposed between second radial surface 128 and piston 116. Clutch facings 130, 132 may include surface features, such as grooves, for fluid flow therethrough to provide cooling to clutch 118 when closed.

Seal ring 134 may be disposed in groove 136 defined in front cover 104 and fixed to front cover 104 by connection 138. Connection 138 between seal ring 134 and front cover 104 may be a welded connection, for example. Seal ring 134 is further sealed to an outer diameter of piston 116 via seal 140. In this way, piston 116 is sealed to front cover 104 via seal ring 134 and release chamber 122 is sealed from apply chamber 120 by seal 140 and seal ring 134 to provide for better clutch controllability. Piston 116 may further be sealed to a transmission input shaft (not shown) at an inner diameter 152 thereof.

Piston 116 includes orifice 142 that is sealed by one-way valve 144 disposed between piston 116 and turbine 110. One-way valve 144 is configured to restrict the flow of fluid to a single direction and is configured to open and/or close under changing pressure. In this embodiment, valve 144 is configured to prevent fluid flow from apply chamber 120 into release chamber 122 via orifice 142 and to allow fluid flow from release chamber 122 into apply chamber 120 via orifice 142 when pressure in release chamber 122 is greater than pressure in apply chamber 120. That is, valve 144 is configured to open when pressure on first axial side 154 exceeds that of pressure on second axial side 156 to allow fluid flow from release chamber 122 through orifice 142 into apply chamber 120 and to close when pressure on second axial side 156 exceeds that of pressure on first axial side 154. In this way, the flow of fluid through orifice 142 is restricted to a single direction, i.e., fluid flow from release chamber 122 into apply chamber 120. This is provided to help reduce pressure bumps. One-way valve 144 may be a reed valve, for example. However, it is to be understood that other types of valves may be used to restrict the flow to one direction. One-way valve 144 may further be connected to piston 116 on axial side 158 facing turbine 110 via connector 146. Connector 146 may be a rivet, for example. Piston 116 is further non-rotatably connected to front cover 104 on axial side 160, opposite axial side 158. Piston 116 may be connected to front cover 104 via leaf springs 162, for example. In one embodiment, piston 116 may be connected to both front cover 104 and valve 144 via a single connection, e.g., connector 146.

Front cover 104 further includes orifice 148 located behind or radially outward of seal ring 134 to connect release chamber 122 to clutch 118 to allow controlled forced cooling flow through clutch 118. Seal ring 134 may include orifice 150 aligned with orifice 148 of front cover 104 such that forced cooling fluid flow through clutch 118 may pass through orifices 148, 150 into release chamber 122. In this way, release chamber 122 is connected to clutch 118 via orifices 148, 150 to provide the necessary clutch cooling during operation of torque converter 100.

Torque converter 100 may be operated in a torque converter clutch closed mode and in a torque converter clutch open mode. In a torque converter clutch closed mode of operation, clutch 118 is engaged or closed by pressurized fluid supplied to apply chamber 120 exceeding pressure in release chamber 122 that displaces piston 116 in axial direction AD1 for torque transmission therebetween. Forced cooling fluid flows from apply chamber 120, through clutch facings 130, 132 (e.g., through grooved surface features defined therein) to cool clutch 118, then flows through orifices 148, 150 defined in front cover 104 and seal ring 134 into release chamber 122. Valve 144 seals orifice 142 defined in piston 116 from the pressure on second axial side 156 exceeding, or being higher, than pressure on first axial side 154 of valve 144. Whereas, in a torque converter clutch open mode of operation, release chamber 122 will pressurize and exceed pressure in apply chamber 120 to open clutch 118, and valve 144 will open to allow flow through orifice 142 defined in piston 116. That is, pressurized fluid in release chamber 122 will force piston 116 to displace in axial direction AD2 away from front cover 104, opposite axial direction AD1 and valve 144 will open from pressure on first axial side 154 exceeding that of pressure on second axial side 156 to allow fluid from release chamber 122 to flow into apply chamber 120.

FIG. 3 shows torque converter 200 having a clutch system according to another embodiment of the present disclosure. FIG. 4 is an enlarged view of area B of torque converter 200 of FIG. 3. FIG. 5 is an enlarged view of area C of torque converter 200 of FIG. 3. The following description is with reference to FIGS. 3-5. Torque converter 200 is rotatable about central axis AR and may include the following components: front cover 204; pump or impeller 206 with outer shell or impeller shell 208 non-rotatably connected to front cover 204; turbine 210, stator 212, and vibration damper 214. These components are shown as examples of components of the torque converter, and in other embodiments could be replaced by any type or style of cover, impeller, turbine, stator, and/or vibration damper known in the art, and in some embodiments, some of these components may not even be included.

Torque converter 200 includes piston 216 that is configured to selectively open and close clutch 218 in response to the pressurization of a medium (e.g., fluid such as oil) in piston apply chamber 220 and fluid release chamber 222. For example, an increase in fluid pressure within piston apply chamber 220 relative to fluid release chamber 222 moves piston 216 in axial direction AD1 toward cover 204, which increases a compressive force on clutch 218, causing clutch 218 to close. Likewise, an increase in fluid pressure within release chamber 222 relative to apply chamber 220 moves piston 216 in axial direction AD2, opposite axial direction AD1, toward turbine 210. Clutch 218 may include clutch plate 224 that also acts as an input to damper 214. Clutch plate 224 includes a first radial surface 226 configured to engage with cover 204 and a second radial surface 228 configured to engage with a portion of piston 216 when clutch 218 is closed. Additionally, clutch facing 230 may be disposed between first radial surface 226 and cover 204, and clutch facing 232 may be disposed between second radial surface 228 and piston 216. Clutch facings 230, 232 may include surface features, such as grooves, for forced cooling fluid flow therethrough.

Seal ring 234 may be disposed between front cover 204 and piston 216 and fixed to front cover 204 by connection 238. Connection 238 between seal ring 234 and front cover 204 may be a welded connection, for example. Seal ring 234 may further be sealed to piston 216 via seal 240 at outer diameter 242. In this way, piston 216 is sealed to front cover 204 via seal ring 234 and release chamber 222 is sealed from apply chamber 220 by seal 240 and seal ring 134 to provide for better clutch controllability. Piston 216 may further be sealed to a transmission input shaft (not shown) at an inner diameter 244 thereof.

Front cover 204 may further include recessed portion, or groove 246 and orifice 248 to connect release chamber 222 to clutch 218 to allow controlled forced cooling flow through clutch 218. Orifice 248 may be located behind or radially outward of seal ring 234 and connect or open into groove 246. Groove 246 may be located adjacent to seal ring 234. In one embodiment, welded connection 238 may further include orifice 250 defined therein, wherein orifice 250 of welded connection 238 is aligned with orifice 248 of front cover 204 such that clutch cooling fluid may flow through clutch 218 (e.g., grooved surfaces defined therein) when closed, through orifice 250 of welded connection 238, through orifice 248 defined in front cover 204, through groove 246 and into release chamber 222. In this way, release chamber 222 is connected to clutch 218 via orifices 248, 250 to allow controlled forced cooling therethrough when clutch 218 is closed. It is to be understood that other configurations and arrangements of cover orifice 248 may be used to connect release chamber 222 to clutch 218 for controlled forced cooling and is within the scope and spirit of this disclosure. For example, the cover orifice may be configured such that cooling fluid flows between the clutch, cover orifice, and release chamber without flowing through the welded connection.

Piston 216 may be non-rotatably connected to the cover via connection 252, which may be a leaf spring connection, and include orifice 254 that allows fluid communication between release chamber 222 and apply chamber 220. Orifice 254 may be located radially inward of connection 252 and may be sealed by one-way valve 256 disposed between piston 216 and output flange 258 of damper 214. One-way valve 256 is configured to restrict the flow of fluids to a single direction and is configured to open and/or close under changing pressure. In this embodiment, valve 256 is configured to prevent fluid flow from apply chamber 220 into release chamber 222 via orifice 254 and to allow fluid flow from release chamber 222 into apply chamber 220 via orifice 254 when pressure in release chamber 222 is greater than pressure in apply chamber 220. That is, valve 256 is configured to open when pressure on first axial side 260 exceeds that of pressure on second axial side 262 to allow fluid flow from release chamber 222 through orifice 254 into apply chamber 220 and to close when pressure on second axial side 262 exceeds that of pressure on first axial side 260. In this way, the flow of fluid through orifice 254 is restricted to a single direction, i.e., fluid flow from release chamber 222 into apply chamber 220. Again, this is provided to help reduce pressure bumps. One-way valve 256 may be a reed valve, for example. However, it is to be understood that other types of valves may be used to restrict the flow to one direction.

Torque converter 200 may further include thrust washer 270 disposed in the thrust path between piston 216 and flange 258 to absorb friction at high differential speeds and support axial loading. Thrust washer 270 may be axially retained on piston 216 on second axial side 262 of valve 256 via connector 272. That is, valve 256 is disposed axially between piston 216 and washer 270. Connector 272 connects both valve 256 and washer 270 to piston 216. In one embodiment, connector 272 may be in the form of a rivet. Connector 272 may further include tapered head 274 that is arranged and configured to function as an anti-rotation feature for thrust washer 270 and as an axial retention feature for washer 270 and valve 256. Washer 270 may further include slots, or recessed portions, 276 defined in a back surface thereof that faces piston 216. Specifically, slots, or recessed portions, 276 are configured and arranged to provide clearance for axial movement, or deflection, of valve 256 in axial direction AD2. Washer 270 may further include a counter bore slot 278 for centering and anti-rotation. Counter bore slot 278 may be tapered for complementing and mating with tapered head 274 of connector 272.

Operation of torque converter 200 will now be described in more detail. Torque converter 200 may operate in a first mode, also referred to as a torque converter clutch closed or apply mode, where clutch 218 is closed for torque transmission therebetween. In the torque converter clutch closed mode, an increase in pressurized fluid in apply chamber 220 relative to release chamber 222 forces piston 216 to displace or move in axial direction AD1 toward the cover 204 closing clutch 218. Forced cooling fluid flows through clutch facings 230, 232 (e.g., grooved surfaces) and into release chamber 222 via orifices 248, 250 defined in front cover 204 and connection 238, respectively. Valve 256 seals orifice 254 defined in piston 216 from the pressure on second axial side 262 exceeding that on first axial side 260.

Torque converter 200 may further operate in a second mode, also referred to as a torque converter open or release mode, where clutch 218 is in an open position relative to cover 204. In torque converter clutch open mode of operation, an increase of pressure in release chamber 222 relative to apply chamber 220 forces piston 216 to displace or move in axial direction AD2 away from cover 204 opening clutch 218. Valve 256 will open in response to pressure on first axial side 260 exceeding that on second axial side 262 to allow flow from release chamber 222 to apply chamber 220 through orifice 254 defined in piston 216.

The embodiments disclosed herein combines the simplicity and cost of a traditional twin face two-pass clutch with some of the controllability benefits of a more complex clutch system by adding a sealed torque converter clutch release pressure chamber. In this design, the hub is removed allowing the piston to seal on the input shaft and this reduces complexity and cost. The seal is incorporated into the piston, reducing the complexity and costs.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
104 front cover
106 impeller
108 impeller shell
110 turbine
112 stator
114 vibration damper
116 piston
118 clutch
120 chamber
122 fluid release chamber
124 clutch plate
126 first radial surface
128 second radial surface
130 clutch facing
132 clutch facing
134 seal ring
136 groove
138 connection
140 seal
142 orifice
144 valve
146 connector
148 orifice
150 orifice
152 inner diameter
154 first axial side
156 second axial side
158 axial side
160 axial side
162 leaf springs
200 torque converter
204 front cover
206 impeller
208 impeller shell
210 turbine
212 stator
214 vibration damper
216 piston
218 clutch
220 apply chamber
222 fluid release chamber
224 clutch plate
226 first radial surface
228 second radial surface
230 clutch facing
232 clutch facing
234 seal ring
238 connection
240 seal
242 outer diameter
244 inner diameter
246 groove
248 cover orifice
250 orifice
252 connection
254 orifice 256 valve
258 output flange
260 first axial side
262 second axial side
270 thrust washer
272 connector
274 tapered head
278 slot

What is claimed is:

1. A torque converter, comprising:
a front cover configured to receive an input torque;
an impeller having an outer shell non-rotatably connected to the front cover;
a turbine fluidly coupled with the impeller; and
a lock-up clutch disposed axially between the front cover and the turbine, the lock-up clutch comprising:
  a piston axially displaceable and including a first opening extending from a first axial side facing the front cover to a second axial side facing the turbine;
  a seal ring fixed to the front cover and sealed to the piston;
  a first fluid chamber formed at least in part by the piston and the turbine;
  a second fluid chamber formed at least in part by the front cover, the seal ring, and the piston; and
  a valve connected to the piston on the second axial side and configured to seal the first opening in response to a first pressure in the first fluid chamber exceeding a second pressure in the second fluid chamber such that fluid is prevented from passing through the first opening in the piston, wherein the front cover includes a second opening defined therein located radially outward of the seal ring and arranged such that forced cooling fluid flow passes through the lock-up clutch to the second fluid chamber via the second opening when the lock-up clutch is closed.

2. The torque converter of claim 1, wherein the valve is configured to open in response to the second pressure exceeding the first pressure such that fluid is routed from the second fluid chamber into the first fluid chamber via the first opening in the piston.

3. The torque converter of claim 1, wherein:
the piston is non-rotatably connected to the front cover on the first axial side via a connector; and
the valve is connected to the second axial side of the piston via the connector.

4. The torque converter of claim 3, wherein the connector is a rivet.

5. The torque converter of claim 1, wherein the seal ring includes a third opening aligned with the second opening and arranged such that the forced cooling fluid flow passes through the lock-up clutch, the second opening, the third opening, and then into the second fluid chamber when the lock-up clutch is closed.

6. The torque converter of claim 1, wherein:
the seal ring is fixed to the front cover by a weld; and
the weld includes a third opening aligned with the second opening and arranged such that the forced cooling fluid flow may pass through the lock-up clutch, the third opening, the second opening, and then into the second fluid chamber.

7. The torque converter of claim 1, further comprising:
a thrust washer axially retained on the second axial side of the piston, wherein the valve is disposed axially between the piston and the thrust washer.

8. The torque converter of claim 7, wherein the thrust washer and the valve are connected to the piston via a single connector.

9. The torque converter of claim 7, wherein the thrust washer includes at least one slot defined in a back surface thereof that faces the piston, wherein the at least one slot is arranged to provide clearance for axial movement of the valve when in an open position.

10. A torque converter, comprising:
a front cover configured to receive an input torque;
an impeller having an outer shell non-rotatably connected to the front cover;
a turbine fluidly coupled with the impeller; and
a lock-up clutch disposed axially between the front cover and the turbine, the lock-up clutch comprising:
  a piston sealed to the front cover and including a first opening;
  a first fluid chamber formed at least in part by the piston and the turbine;
  a second fluid chamber formed at least in part by the front cover and the piston, wherein the first opening fluidly connects the first fluid chamber and the second fluid chamber; and
  a valve connected to the piston and configured to seal the first opening in response to a first pressure in the first fluid chamber exceeding that of a second pressure in the second fluid chamber, wherein cooling fluid flow is configured to pass through the lock-up clutch into the second fluid chamber via a second opening defined in the front cover when the lock-up clutch is in a closed position.

11. The torque converter of claim 10, further comprising a seal ring disposed between the front cover and the piston, wherein the seal ring is fixed to the front cover and sealed to an outer diameter of the piston.

12. The torque converter of claim 10, wherein, in a first mode of operation:
the lock-up clutch is in an open position;
the second pressure in the second fluid chamber exceeds that of the first pressure in the first fluid chamber; and
the valve is open such that fluid is routed from the second fluid chamber into the first fluid chamber through the first opening.

13. The torque converter of claim 12, wherein, in a second mode of operation:
the lock-up clutch is in the closed position;
the first pressure in the first fluid chamber exceeds the second pressure in the second fluid chamber; and
the valve is closed such that fluid is prevented from passing through the first opening.

14. The torque converter of claim 10, further comprising:
a vibration damper including an output flange; and
a thrust washer axially retained on the piston and arranged in a thrust path between the piston and the output flange.

15. A torque converter, comprising:
a front cover configured to receive an input torque;
an impeller having an outer shell non-rotatably connected to the front cover;
a turbine fluidly coupled with the impeller; and
a lock-up clutch disposed axially between the front cover and the turbine, the lock-up clutch comprising:
  a piston sealed to the front cover and including a first opening;
  a first fluid chamber formed at least in part by the piston and the turbine;

a second fluid chamber formed at least in part by the front cover and the piston, wherein the first opening fluidly connects the first fluid chamber and the second fluid chamber;

a valve connected to the piston and configured to be movable between an open position wherein fluid can flow from the second fluid chamber into the first fluid chamber via the first opening in the piston and a closed position wherein the first opening is sealed such that the fluid is prevented from passing through the first opening in the piston; and a thrust washer connected to the piston, wherein the valve is disposed axially between the piston and the thrust washer, the thrust washer includes at least one slot defined in a surface facing the piston, and the at least one slot is arranged to provide clearance for axial movement of the valve when in the open position.

16. The torque converter of claim 15, wherein:

the valve is configured to move into the closed position in response to a pressure in the first fluid chamber exceeding a pressure in the second fluid chamber such that fluid is prevented from passing through the first opening in the piston; and the valve is configured to move into the open position in response to the pressure in the second fluid chamber exceeding the pressure in the first fluid chamber such that fluid is prevented from passing through the first opening in the piston.

* * * * *